(12) United States Patent
Pelley

(10) Patent No.: US 8,556,056 B1
(45) Date of Patent: Oct. 15, 2013

(54) CLUTCH ASSEMBLY

(76) Inventor: Daniel R. Pelley, Grand Ledge, MI (US)

( * ) Notice: Subject to any disclaimer, the term of this patent is extended or adjusted under 35 U.S.C. 154(b) by 0 days.

(21) Appl. No.: 13/559,557

(22) Filed: Jul. 26, 2012

(51) Int. Cl.
*F16D 3/06* (2006.01)

(52) U.S. Cl.
USPC ........................................ 192/70.18; 192/200

(58) Field of Classification Search
USPC .............................. 192/70.16, 70.18, 112, 200
See application file for complete search history.

(56) References Cited

U.S. PATENT DOCUMENTS

| | | | | |
|---|---|---|---|---|
| 2,211,192 A | * | 8/1940 | Wolfram | 192/70.18 |
| 3,981,381 A | * | 9/1976 | Nosek | 192/70.18 |
| 4,057,131 A | * | 11/1977 | Flotow | 192/70.13 |
| 4,566,573 A | * | 1/1986 | Lane, Jr. | 192/70.18 |
| 4,790,419 A | * | 12/1988 | Loizeau | 192/70.18 |
| 4,941,557 A | * | 7/1990 | Flotow et al. | 192/70.252 |
| 6,305,520 B1 | * | 10/2001 | Kimmig et al. | 192/70.252 |
| 6,702,082 B2 | * | 3/2004 | Dorfler et al. | 192/70.18 |
| 2005/0121282 A1 | * | 6/2005 | Fox | 192/70.19 |

* cited by examiner

*Primary Examiner* — David D Le
*Assistant Examiner* — Huan Le
(74) *Attorney, Agent, or Firm* — Inventa Capital PLC

(57) ABSTRACT

A clutch assembly (the assembly) is mounted adjacent a flywheel of the assembly connected to a crankshaft (not shown) of a vehicle engine such that rotational movement of the crankshaft by the vehicle engine is transmitted to the flywheel. The assembly includes annular clutch disks each presenting a pair of friction facings. A center plate is rotatably and coaxially disposed about the shaft. A spacer or adapter ring is connected to the center plate. A plurality of clutch levers are cooperable with a clutch cover. The levers are circumferentially spaced about the shaft to selective engage and disengage of the annular clutch disks by the flywheel, the center plate. The clutch assembly design provides for a space defined between the flywheel and the clutch cover to form easy access to clean the clutch assembly from outside and allow smaller particles or contaminants and fluids to be expelled from gaps defined between the flywheel and the components of the clutch assembly.

9 Claims, 5 Drawing Sheets

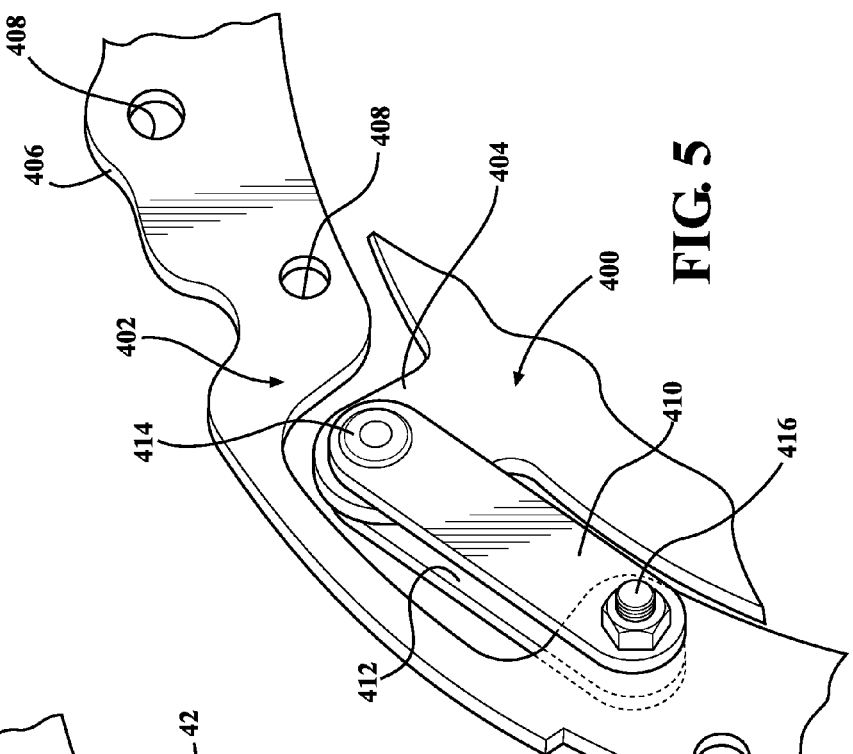
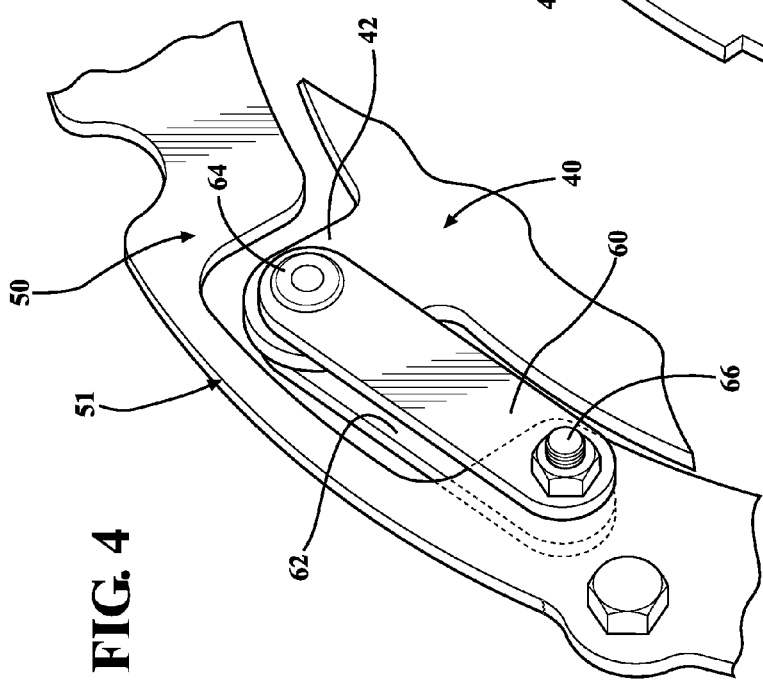
FIG. 4
FIG. 5

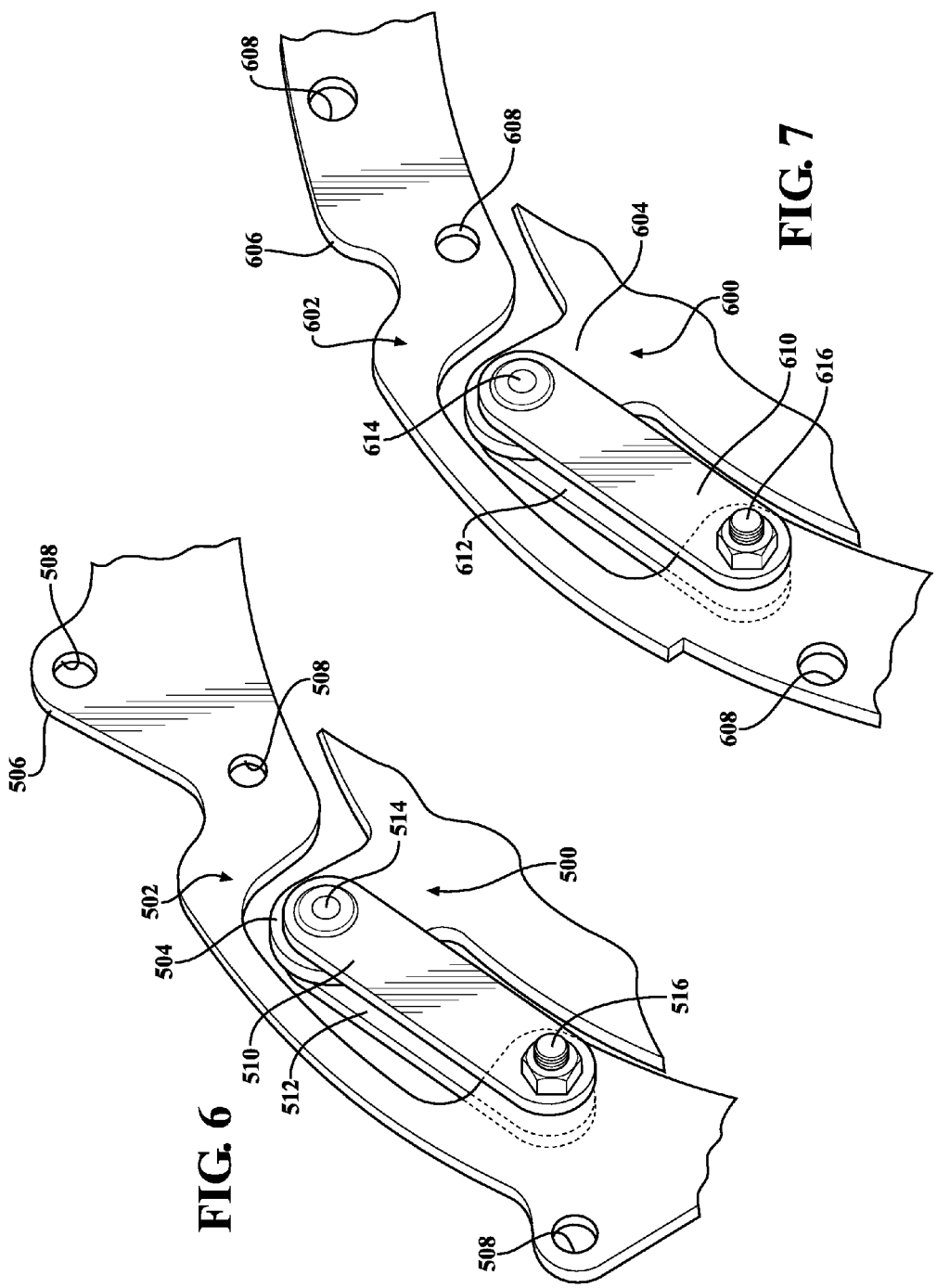

CLUTCH ASSEMBLY

FIELD OF THE INVENTION

The present invention relates in general to clutch assemblies for vehicles.

BACKGROUND OF THE INVENTION

A friction clutch assembly is typically utilized to connect a vehicle engine to a transmission or power take-off assembly. Numerous prior art clutch assemblies are taught by U.S. Pat. Nos. 4,941,557 to Flotow et al., 5,213,185 to Flotow, 5,730,266 to Kajitani et al., and 6,098,773 to Blessinger et al. The typical prior art clutch assembly. The facings are attached to the opposing faces of the forward and rearward annular clutch disks. The clutch disks are connected to respective hub members for rotation therewith. The hubs are splined onto an input shaft and are axially movable thereon.

The clutch assembly includes a center plate or an intermediate plate is rotatably and coaxially disposed about the input shaft and disposed between the forward and rearward clutch disks. A clutch cover of the prior art assembly is attached to the flywheel through an adapter or spacer ring by a plurality of threaded fasteners or any other suitable means.

Alluding to the above, the prior art clutch assembly also includes a plurality of clutch levers, which are cooperable with the clutch cover. The levers are circumferentially spaced about the input shaft to selective engage and disengage of the forward and rearward disks by the flywheel, the center plate.

The aforementioned prior art references have numerous problems. For example, the clutch assembly as taught by the U.S. Pat. No. 4,941,557 to Flotow et al., shows a cover plate and all parts of the assembly connected directly to a flywheel thereby eliminating any gaps or voids that will allow to remove smaller particles or contaminants and fluids. Another problem associated with the clutch assembly taught by the U.S. Pat. No. 4,941,557 to Flotow et al. is a weak connection defined between the adapter ring and the center plate failing to provide rigid connection between these two parts that may result in malfunctioning of the clutch assembly and reduce lifespan of the clutch assembly by limiting total release necessary for complete clutch engagement.

Therefore, an opportunity exists for improved clutch assembly with improved life span and a unique design to eliminate one or more problems associated with the aforementioned prior art clutch assemblies.

SUMMARY OF THE INVENTION

A frictional clutch assembly (the assembly) for a motor vehicle is connected to an engine block. The assembly is mounted adjacent a flywheel connected to a crankshaft (not shown) of the engine block in a known manner and as known to those skilled in engine art and without limiting the scope of the present invention, such that rotational movement of the crankshaft by the engine block is transmitted to the flywheel. The assembly includes forward and rearward annular clutch disks each presenting opposite faces and a pair of friction facing portions. The facing portions are attached to the opposite faces of the forward and rearward annular clutch disks. The clutch disks are connected to respective hub members for rotation therewith. The hubs are splined onto an input shaft (not shown) and are axially movable thereon.

A center plate or an intermediate plate is rotatably and coaxially disposed about the input shaft. The center plate is disposed between the forward and rearward clutch disks. The center plate includes a plurality of fingers extending radially and being integral with the center plate. A clutch cover is attached to the flywheel through an adapter or spacer ring by a plurality of threaded fasteners or any other suitable means, such as, for example, rivets. The adapter ring includes a plurality of the cut out portions of different contours and configurations defined about the periphery of the spacer ring to mate with the fingers extending from the center plate.

The center plate of the present invention is connected to the adapter ring by a pair of links wherein the fingers or pins integral with and extending from the center plate are sandwiched between the links thereby forming rigid engagement between the adapter ring and the center plate. Here the center plate needs to be suspended rigid and yet flexible enough to be moved about 0.030 from its static home to clamp the primary disc. A plurality of clutch levers are cooperable with the clutch cover. The levers are circumferentially spaced about the input shaft to selective engage and disengage of the forward and rearward disks by the flywheel and the center plate.

The clutch assembly presents a plurality of bossed portions removably connected to the flywheel thereby providing a space between the flywheel and the clutch cover with all of the aforementioned components of the clutch assembly to present easy access to clean the clutch assembly from outside and allow smaller particles or contaminants and fluids to be expelled from gaps defined between the flywheel and the components of the clutch assembly. The inventive system is adaptable to allow for debris expelling and heat venting because of stands or raised portions added thereon.

An advantage of the present invention is to provide an inventive clutch assembly that includes a unique mechanical connection defined between the center plate and the adapter ring wherein the adapter ring is connected to the center plate by a pair of links with the center plate being sandwiched between the links to form rigid engagement between the adapter ring and the center plate thereby preventing and limiting any relative movement between the center plate and the adapter ring.

Another advantage of the present invention is to provide a unique design of the clutch assembly presenting a plurality of bossed portions removably connected to a flywheel thereby providing a space between the flywheel and all remaining components of the clutch assembly to present easy access to clean the clutch assembly from outside and allow smaller particles or contaminants and fluids to be expelled from gaps defined between the flywheel and the components of the clutch assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 illustrates a partial view of a center plate of the present invention connected to an adapter ring by a pair of links wherein a pin integral with and extending from the center plate is sandwiched between the links thereby forming rigid engagement between the adapter ring and the center plate;

FIG. 5 illustrates a partial view of a first alternative embodiment of the adapter ring presenting a contour different than the contour of the adapter ring of FIG. 4 and the center plate connected to the adapter ring by the links wherein the center plate is sandwiched between the links thereby forming rigid engagement between the adapter ring and the center plate;

FIG. 6 illustrates a partial view of a second alternative embodiment of the adapter ring presenting a contour different than the contour of the adapter ring of FIG. 4 and the center plate connected to the adapter ring by the links wherein the center plate is sandwiched between the links thereby forming rigid engagement between the adapter ring and the center plate; and FIG. 7 illustrates a partial view of a third alternative embodiment of the adapter ring presenting a contour different than the contour of the adapter ring of FIG. 4 and the center plate connected to the adapter ring by the links wherein the center plate is sandwiched between the links thereby forming rigid engagement between the adapter ring and the center plate.

DESCRIPTION OF THE INVENTION

Figure 1:
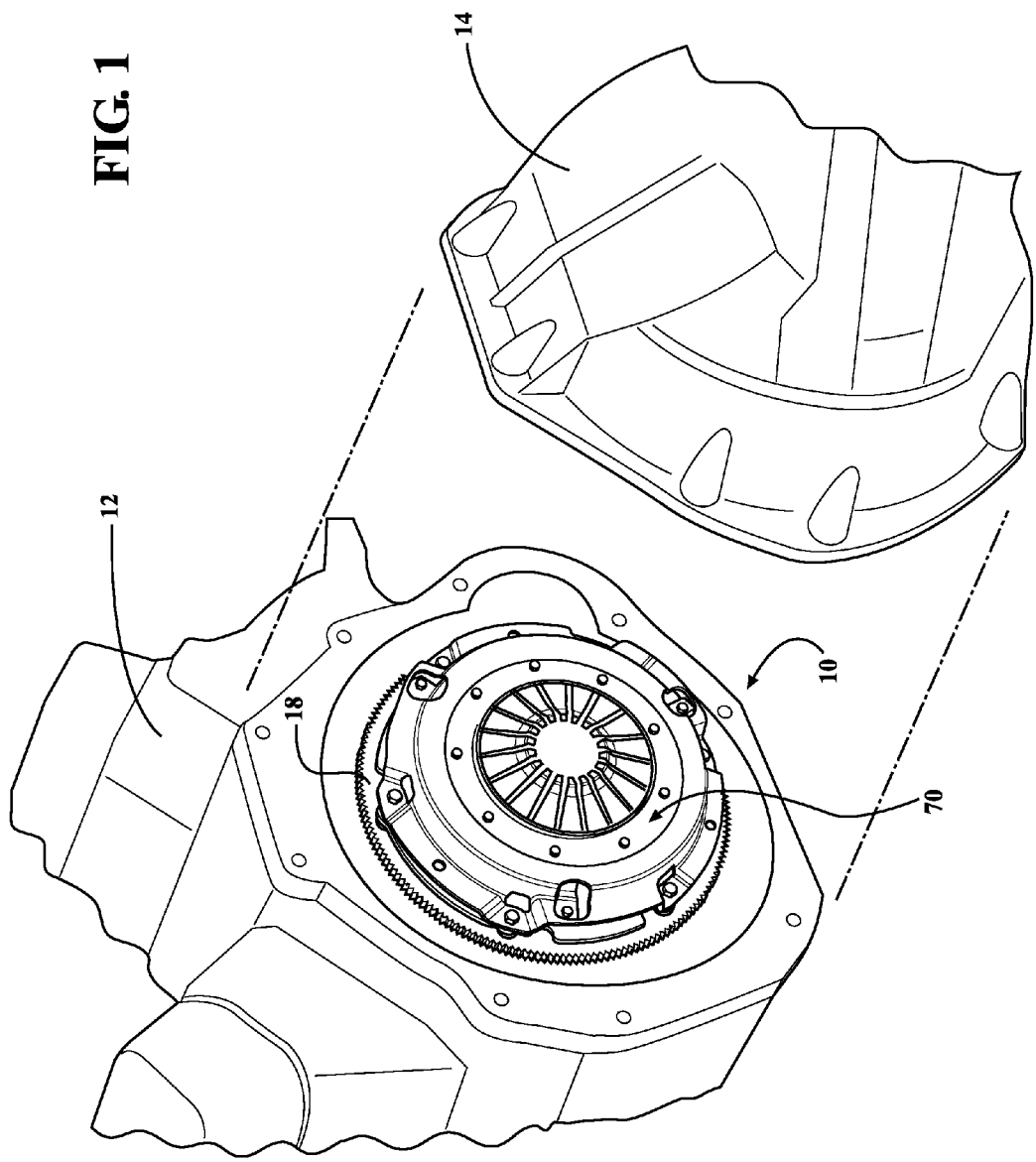
FIG. 1 illustrates a perspective and exploded view of an inventive clutch assembly operably connected to an engine crankshaft.
Figure 2:
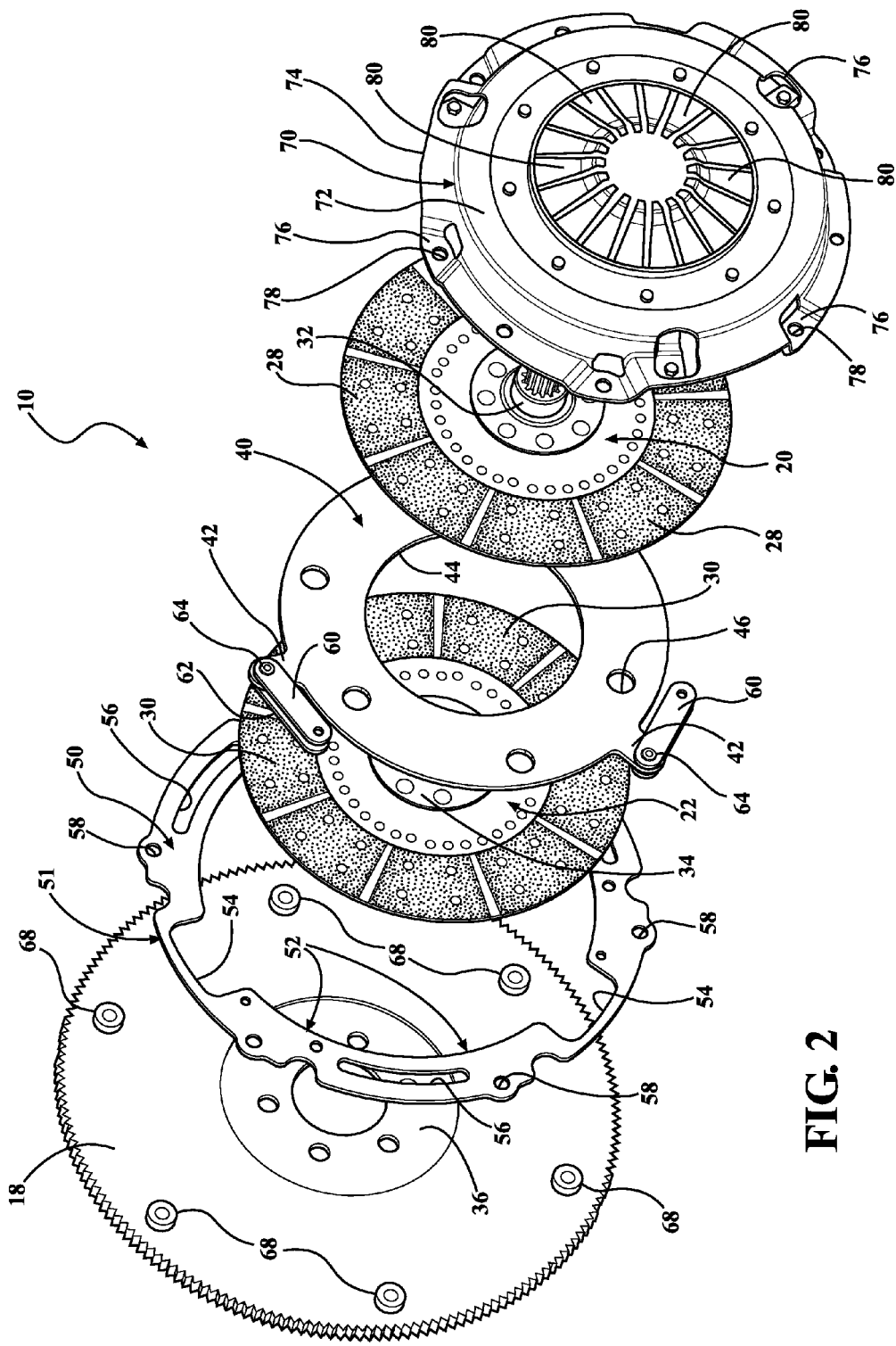
FIG. 2 illustrates an exploded view of the clutch assembly as shown in FIG. 1.
Figure 3:
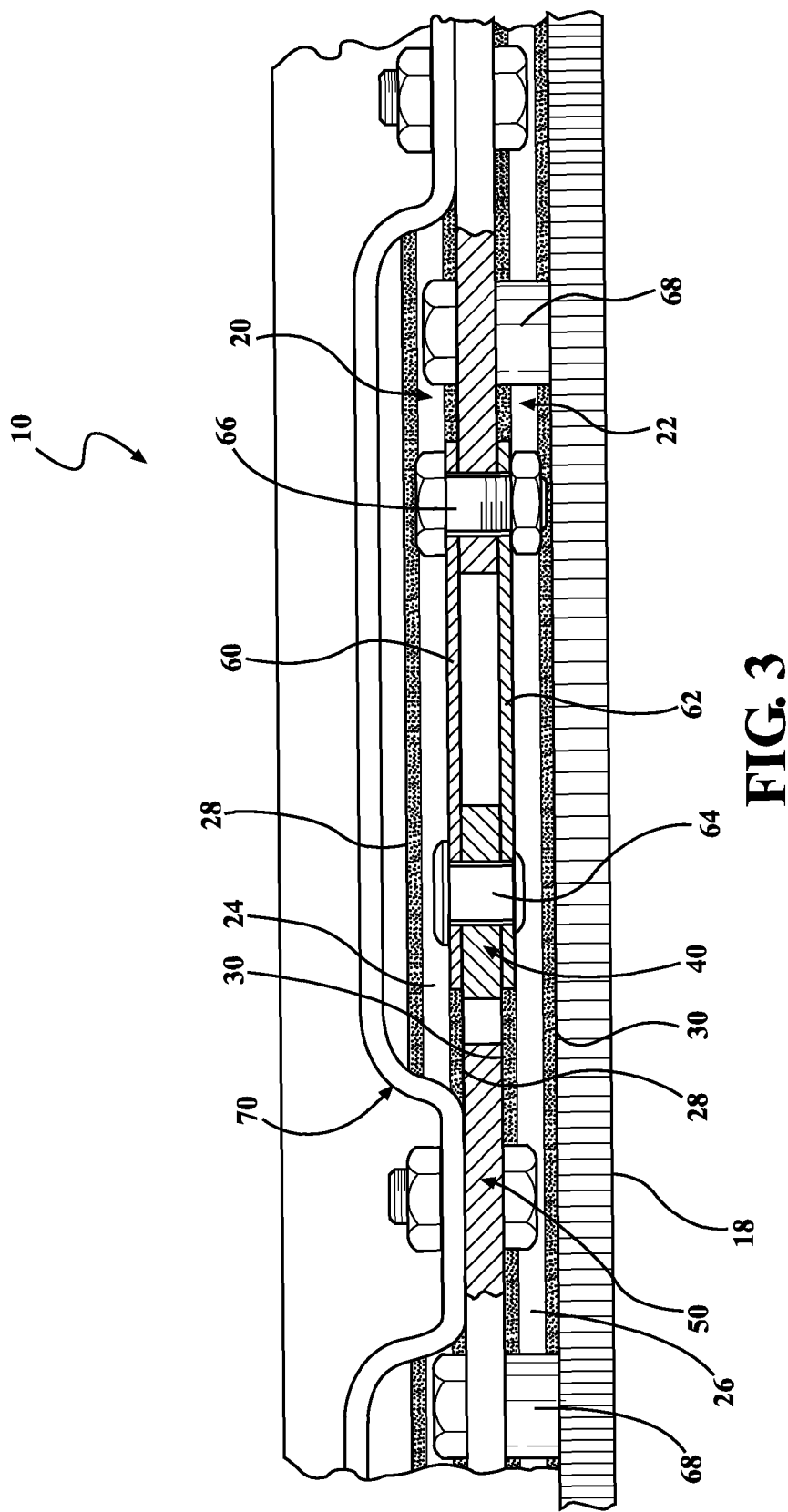
FIG. 3 illustrates a partial and cross sectional view of the clutch assembly.

Referring to FIGS. 1 through 3, and wherein like numerals indicate like or corresponding parts throughout the several views, a clutch assembly sealing (the assembly) of the present invention is generally shown at 10. The words "inner", "inwardly" and "outer", "outwardly" refer to directions toward and away from, respectively, a designated centerline or a geometric center of an element being described, the particular meaning being readily apparent from the context of the description.

FIG. 1 illustrates a perspective and exploded view of the assembly 10 operably connected to an engine block 12 having a cover 14. The assembly 10 is illustrated as being mounted adjacent a flywheel 18 connected to a crankshaft (not shown) of the vehicle engine 12 in a known manner, such that rotational movement of the crankshaft by the vehicle engine is transmitted to the flywheel 18. As best illustrated in FIGS. 2 and 3, the assembly 10 includes forward and rearward annular clutch disks, generally indicated at 20 and 22, respectively. Each of the forward and rearward annular clutch disks 20 and 22 includes opposite faces or surfaces 24 and 26. Each of the forward and rearward annular clutch disks 20 and 22 includes a pair of friction sections or faces 28 and 30, respectively attached to the opposite faces or surfaces 24 and 26. The friction sections or faces 28 and 30 are formed from organic, ceramic, feramic or kevlor materials without limiting the scope of the present invention. The thickness of the forward and rearward annular clutch disks 20 and 22 is 0.305 inch and the diameter of the forward and rearward annular clutch disks 20 and 22 is 9.69 inches. Those skilled in the art will appreciate that various other dimensions may be used and the one illustrated herewith are not intended to limit the scope of the present invention.

Alluding to the above, the forward and rearward annular clutch disks 20 and 22 are connected to respective hub portions 32 and 34 for rotation therewith. The hubs 32 and 34 include inner surface presenting male connectors to meshingly engage with a female connectors of an input shaft (not illustrated) and are axially movable thereon. Those skilled in the automotive art will appreciate that the input shaft is typically piloted at its forward end in a bearing 36 retained in the flywheel 18 and can be connected at its rearward end to a set of gears (not shown) in a transmission.

An intermediate plate or a center plate is generally indicated at 40 in FIGS. 2 through 4. Alternative embodiments of the center plate 40 are also shown in FIGS. 5 through 7 and are generally indicated at 400, 500, and 600. The center plate 40 is rotatably and coaxially disposed about the input shaft (not shown). The center plate 40 is disposed between the forward and rearward clutch disks 20 and 22, respectively, while a pressure plate (not illustrated) is disposed rearwardly of the rearward clutch disk 20. The center plate 40 includes a plurality of fingers 42 extending radially and being integral with the center plate 40. The center plate 40 defines an opening 54. The thickness of the center plate 40 is 0.250 inch and the diameter is 9.69 inch. Those skilled in the art will appreciate that various other dimensions may be used and the one illustrated herewith are not intended to limit the scope of the present invention.

As best illustrated in FIGS. 2 and 3, an adapter ring is generally indicated at 50. The adapter ring 50 presents a contour, generally indicated at 51, and inner contour, generally indicated at 52 in FIG. 2. A plurality of cut out portions 54 of a generally rectangular configuration are defined by and extend from the inner contour 52. A plurality of elongated slots 56 are defined in the adapter ring 50 and are alternated and spaced by the cut out portions 54. A plurality of openings 58 are defined in the adapter ring 50. The cut out portions 54, the elongated slots 56 and the openings 58 may include various configurations and sizes and are not intended to limit the scope of the present invention. The center plate 40 is connected to the adapter ring 50 by links 60 and 62 wherein the center plate 40 is sandwiched between the links 60 and 62 thereby forming rigid engagement between the adapter ring 50 and the center plate 40 thereby preventing relative movement between the center plate 40 and the adapter ring 50. This engagement allows and ensures that the center plate 40 being fixedly and rigidly sandwiched within the adapter ring 50, will stay within the adapter ring 50.

Other prior art references used different straps and mechanism for interconnecting prior art adapter ring with the center plate only on one side of the prior art center plate and adapter ring thereby allowing the center plate to deform or sag over time. As a result, the prior art clutch assembly had to be replaced. The center plate 40 is connected to the adapter ring 50 by the links 60 and 62 by a rivet 64 extending through the fingers 42 and the links 60 and 62 and a fastener 66 extending through the links 60 and 62 and the adapter ring 50. Those skilled in the art will appreciate that other types of fasteners, rivets, and connectors, not shown on FIGS. 2 and 3, may be used to connect the center plate 40 with the adapter ring 50 are not intended to limit the scope of the present invention. Each link 60 and 62 presents a configuration of elongated plates having a length of 3.12 inch and the width of 0.75 inch. Those skilled in the art will appreciate that various other dimensions may be used and the one illustrated herewith are not intended to limit the scope of the present invention. The links 60 and 62 may present a non-planar configuration as well.

The thickness of the center plate 40 is 0250 inch and the diameter is 9.69 inch. Those skilled in the art will appreciate that various other dimensions may be used and the one illustrated herewith are not intended to limit the scope of the present invention. The thickness of the retainer ring 50 is 0.250 inch and the diameter is 9.69 inch. Those skilled in the art will appreciate that various other dimensions may be used and the one illustrated herewith are not intended to limit the scope of the present invention.

As best illustrated in FIGS. 2 and 3, a plurality of bossed elements 68 are spaced about the flywheel 18 and are removably connected to the flywheel to connect a clutch cover, generally indicated 70, and the other aforementioned components thereby providing a space between the flywheel 18 and the rearward clutch disk 22 of the clutch assembly 10 to present easy access to clean the clutch assembly 10 from outside and allow smaller particles or contaminants and fluids to be expelled from gaps defined between the flywheel 18 and the rearward clutch disk 22. The bossed elements 68 may present ea circular or a non-circular cross section and the shape as illustrated in FIGS. 2 and 3 is not intended to limit the scope of the present invention.

Alluding to the above, the bossed elements 68 are removably attached to the flywheel 18 or connected thereto by any mechanical and welding means without limiting the scope of the present invention. The height of the bossed element 68 is about 0.325 and the diameter is about 0.750 but could vary without limiting the scope of the present invention. Those skilled in the art will appreciate that various other dimensions may be used and the one illustrated herewith are not intended to limit the scope of the present invention. The bossed element 68 is formed from metals or metal alloys. Those skilled in the art will appreciate that various other materials may be used and the one illustrated herewith are not intended to limit the scope of the present invention.

A clutch cover is generally indicated at 70 in FIGS. 2 and 3. is attached to the flywheel through the adapter or spacer ring 50 by a plurality of threaded fasteners or any other suitable means, such as, for example, rivets. The clutch cover 70 includes a dish portion 72 extending to a peripheral edge 74 defining a plurality of pressed in areas 76 with holes 78 to receive the fastener in order to be connected to the flywheel 18 through the bosses 68. A plurality of clutch levers 80 are cooperable with the clutch cover 70. The levers 80 are circumferentially spaced about the input shaft to selective engage and disengage of the forward and rearward disks 20 and 22 by the flywheel 18, the center plate 40, and the pressure plate. A plurality of return springs (not illustrated) cooperate with a throw-out bearing (not illustrated) in a conventional manner to provide for such engaging and disengaging movements of the clutch levers 80, as will be appreciated by those skilled in the art. As appreciated by those skilled in a clutch art, movement toward the engaged position is considered to be forward movement in the clutch assembly 10, while movement toward the disengaged position is considered to be rearward movement in the clutch assembly 10.

The links 60 and 62, the adapter ring 50, the center plate 40, the bossed elements 68, and the cover 70 are formed from metals or metal alloys. Those skilled in the art will appreciate that various other materials may be used and the one illustrated herewith are not intended to limit the scope of the present invention. The links 60 and 62, the adapter ring 50, the center plate 40, the bossed elements 68, and the cover 70 are formed by injection molding, stamping, cast methods, laser cutting, water jet cutting, wire cutting, and or milling and combination thereof. Those skilled in the art will appreciate that various other method of manufacturing of the links 60 and 62, the adapter ring 50, the center plate 40, the bossed elements 68, and the cover 70 may be used without intent to limit the scope of the present invention.

FIG. 5 illustrates a partial view of a first alternative embodiment of the center plate, generally indicated at 400, and the adapter ring, generally indicated at 402. The center plate 400 includes a plurality of fingers (only one is shown) 404. The adapter ring 402 presents a contour 406 being different than the contour of the adapter plate as shown in FIG. 4. A plurality of openings 408 are defined in the adapter ring 402. The center plate 400 is connected to the adapter ring 402 by the links 410 and 412 wherein the center plate 400 is sandwiched between the links 410 and 412 thereby forming rigid engagement between the adapter ring 402 and the center plate 400 thereby preventing relative movement between the center 400 and the adapter ring 402. The center plate 400 is connected to the adapter ring 402 by the links 410 and 412 by a rivet 414 extending through the finger 404 and the links 410 and 412 and a fastener 416 extending through the links 410 and 412 and the adapter ring 402. Those skilled in the art will appreciate that other types of fasteners, rivets, and connectors, not shown on FIG. 5, may be used to connect the center plate 400 with the adapter ring 402 and the fastener 416 and the rivet 414 are not intended to limit the scope of the present invention. The thickness of the center plate 400 and the adapter ring 402 is 0.250 inch and the diameter is 9.69 inch. Those skilled in the art will appreciate that various other dimensions may be used and the one illustrated herewith are not intended to limit the scope of the present invention.

FIG. 6 illustrates a partial view of a second alternative embodiment of the center plate, generally indicated at 500, and the adapter ring, generally indicated at 502. The center plate 500 includes a plurality of fingers (only one is shown) 504. The adapter ring 502 presents a contour 506 being different than the contour of the adapter plate as shown in FIG. 4. A plurality of openings 508 are defined in the adapter ring 502. The center plate 500 is connected to the adapter ring 502 by the links 510 and 512 wherein the center plate 500 is sandwiched between the links 510 and 512 thereby forming rigid engagement between the adapter ring 502 and the center plate 500 thereby preventing relative movement between the center 500 and the adapter ring 502. The center plate 500 is connected to the adapter ring 502 by the links 510 and 512 by a rivet 514 extending through the finger 504 and the links 510 and 512 and a fastener 516 extending through the links 510 and 512 and the adapter ring 502. Those skilled in the art will appreciate that other types of fasteners, rivets, and connectors, not shown on FIG. 6, may be used to connect the center plate 500 with the adapter ring 502 and the fastener 516 and the rivet 514 are not intended to limit the scope of the present invention. The thickness of the center plate 500 and the adapter ring 502 is 0.250 inch and the diameter is 9.69 inch. Those skilled in the art will appreciate that various other dimensions may be used and the one illustrated herewith are not intended to limit the scope of the present invention.

FIG. 7 illustrates a partial view of a third alternative embodiment of the center plate, generally indicated at 600, and the adapter ring, generally indicated at 602. The center plate 600 includes a plurality of fingers (only one is shown) 604. The adapter ring 602 presents a contour 606 being different than the contour of the adapter plate as shown in FIG. 4. A plurality of openings 608 are defined in the adapter ring 602. The center plate 600 is connected to the adapter ring 602 by the links 610 and 612 wherein the center plate 600 is sandwiched between the links 610 and 612 thereby forming rigid engagement between the adapter ring 602 and the center plate 600 thereby preventing relative movement between the center 600 and the adapter ring 602. The center plate 600 is connected to the adapter ring 602 by the links 610 and 612 by a rivet 614 extending through the finger 604 and the links 610 and 612 and a fastener 616 extending through the links 610 and 612 and the adapter ring 602. Those skilled in the art will appreciate that other types of fasteners, rivets, and connectors, not shown on FIG. 7, may be used to connect the center plate 600 with the adapter ring 602 and the fastener 616 and the rivet 614 are not intended to limit the scope of the present invention. The thickness of the center plate 600 and the adapter ring 602 is 0.250 inch and the diameter is 9.69 inch. Those skilled in the art will appreciate that various other dimensions may be used and the one illustrated herewith are not intended to limit the scope of the present invention.

An advantage of the present invention is to provide the inventive clutch assembly 10 that includes a unique mechanical connection defined between the center plate 40 and the adapter ring 50 wherein the adapter ring 50 is connected to the center plate 40 by the pair of links 60 and 62 with the center plate 40 is sandwiched between the links 60 and 62 to form rigid engagement between the adapter ring 50 and the center plate 40 thereby preventing and limiting any relative movement between the center plate 40 and the adapter ring 50.

Another advantage of the present invention is to provide a unique design of the clutch assembly 10 presenting a plurality of bossed portions 68 removably connected to the flywheel 18 thereby providing a space between the flywheel 18 and all remaining components of the clutch assembly 10 to present easy access to clean the clutch assembly 10 from outside and allow smaller particles or contaminants and fluids to be expelled from gaps defined between the flywheel 18 and the components of the clutch assembly 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A clutch assembly for connecting a vehicle engine to a transmission assembly comprising:
   a flywheel connected to the vehicle engine;
   a pair of forward and rearward annular clutch disks;
   a center plate extending to a peripheral edge with a plurality of fingers extending radially and being integral with said center plate;
   an adapter ring defining a terminal edge and surrounding said center plate with each of said adapter ring and said center plate presenting opposite surfaces being coplanar relative to one another as said center plate is disposed within said adapter ring;
   a cover for enclosing said forward and rearward annular clutch disks, said adapter ring and said center plate to said flywheel; and
   a plurality of mechanical connections defined by a pair of links sandwiching said fingers to rigidly engage said adapter ring and said center plate to prevent relative movement between said center plate and adapter ring to ensure that said center plate is fixedly and rigidly sandwiched within said adapter ring thereby linking said center plate to said adapter ring at multiple locations about said adapter ring thereby forming rigid engagement between said adapter ring and said center plate to limit relative movement between said center plate and said adapter ring and form a space defined between said flywheel and said rearward annular clutch disk to provide easy access for removing smaller particles, contaminants and fluids from the space.

2. A clutch assembly as set forth in claim 1, wherein said adapter ring presents a peripheral contour and inner contour.

3. A clutch assembly as set forth in claim 2, wherein said adapter ring includes a plurality of cut out portions of a generally rectangular configuration extending from said inner contour to said peripheral contour.

4. A clutch assembly as set forth in claim 3, wherein said adapter ring includes a plurality of elongated slots defined in said adapter ring and being alternated and spaced by said cut out portions.

5. A clutch assembly as set forth in claim 4, including a plurality of bossed elements spaced about said flywheel and being removably connected to said flywheel to connect said clutch cover, said center plate, and said adapter ring, thereby providing a space between said flywheel and said rearward clutch disk to provide easy access to clean said clutch assembly from outside and allow smaller particles and contaminants and fluids to be expelled from the space defined between said flywheel and said rearward clutch disk.

6. A clutch assembly as set forth in claim 5, wherein said bossed elements present at least one of circular and non-circular cross sections.

7. A clutch assembly as set forth in claim 6, wherein said cover includes a dish portion extending to a peripheral edge defining a plurality of pressed in areas with holes to receive fasteners in order to be connected to said flywheel through said bossed elements, and a plurality of clutch levers connected to said dish portion.

8. A clutch assembly as set forth in claim 7, wherein said links, said adapter ring, said center plate, said bossed elements, and said cover are formed from at least one of metals and metal alloys.

9. A clutch assembly for connecting a vehicle engine to a transmission assembly that includes a flywheel connected to the vehicle engine, a pair of forward and rearward annular clutch disks:
   a center plate extending to a peripheral edge with a plurality of fingers extending radially and being integral with said center plate;
   an adapter ring defining a terminal edge and surrounding said center plate with each of said adapter ring and said center plate presenting opposite surfaces being coplanar relative to one another as said center plate is disposed within said adapter ring, a plurality of cut out portions of a generally rectangular configuration defined in said adapter ring and presenting a generally rectangular configuration extending from an inner contour to a peripheral contour; and
   a pair of links sandwiching said fingers to rigidly engage said adapter ring and said center plate to prevent relative movement between said center late and said adapter ring to ensure that said center plate is fixedly and rigidly sandwiched within said adapter ring thereby linking said center plate to said adapter ring at multiple locations about said adapter ring thereby forming rigid engagement between said adapter ring and said center plate to limit relative movement between said center plate and said adapter ring and forming a space defined between the flywheel and the forward and rearward annular clutch disks, said adapter ring, said center plate to provide easy access for removing smaller particles, contaminants and fluids from the space.

* * * * *